United States Patent [19]

Riding et al.

[11] Patent Number: 4,682,905

[45] Date of Patent: Jul. 28, 1987

[54] BRAKE PAD RETAINING PLATE ASSEMBLIES FOR USE IN BRAKE SHOE ASSEMBLIES

[75] Inventors: Kenneth Riding, Liverpool; John Adamson, Wirral, both of England

[73] Assignee: Lucas Industries public limited company, Birmingham, England

[21] Appl. No.: 826,629

[22] Filed: Feb. 6, 1986

[30] Foreign Application Priority Data

Feb. 6, 1985 [GB] United Kingdom ................ 8502953

[51] Int. Cl.⁴ .......................... B25G 3/18; F16B 21/00
[52] U.S. Cl. .................................... 403/327; 188/73.1; 188/244
[58] Field of Search ................... 188/73.1, 73.2, 73.32, 188/234, 242, 244, 245, 250 G; 403/328, 327

[56] References Cited

U.S. PATENT DOCUMENTS

| | | | |
|---|---|---|---|
| 1,796,433 | 3/1931 | Blume | 188/250 G X |
| 4,301,895 | 11/1981 | Harrison et al. | 188/234 X |
| 4,371,061 | 2/1983 | Ottewell | 188/250 G X |

FOREIGN PATENT DOCUMENTS

| | | | |
|---|---|---|---|
| 485144 | 10/1929 | Fed. Rep. of Germany | 188/234 |
| 2750264 | 5/1979 | Fed. Rep. of Germany | 188/250 G |

Primary Examiner—George E. A. Halvosa
Attorney, Agent, or Firm—Scrivener and Clarke

[57] ABSTRACT

The present invention provides a brake pad retaining plate assembly which is a sub-assembly which can be simply bolted to the plate of a brake shoe assembly. This sub-assembly basically comprises a retaining plate which has a pair of bolts screwed into parallel bores in one end of the plate, the shafts of the bolts extending through aligned bores in first and second plate members. A spring engages over the shaft of each bolt and engages against the retaining plate, biassing the plate members towards the heads of the bolts; the plate member nearest to the retaining plate being adapted to be secured to the shoe plate. Thus the brake pad retaining assembly of the present invention can be mounted simply by bolting the plate member nearest the retaining plate, to the shoe plate. Further, the retaining plate can only be released by engaging a suitable tool between the plate members. Thus accidental release cannot occur.

8 Claims, 3 Drawing Figures

BRAKE PAD RETAINING PLATE ASSEMBLIES FOR USE IN BRAKE SHOE ASSEMBLIES

The present invention relates to a brake pad retaining plate assembly for use in a brake shoe assembly.

In particular the present invention relates to a brake pad retaining plate assembly for use in a brake shoe assembly for a railway vehicle disc brake. Such a shoe assembly basically comprises a metal plate to which a pad of friction material is secured. The metal plate is usually generally rectangular with a number of bearing housings formed on one face, for pivotally supporting the brake shoe assembly. The other face of said plate is generally planar with a dovetail recess extending along the major part of the length of the plate. The pad of friction material is formed with a complimentary dovetail shape on one face, this shaped portion being encased in metal. The pad can thus be secured to the plate by sliding the dovetail shaped portion of the pad into the complimentary dovetail recess of the plate. To secure the friction pad in the dovetail recess of the plate, a brake pad retaining plate assembly is provided, this latter assembly having a spring loaded plate member which extends through a slot in said metal plate, into the dovetail recess, the plate member blocking off the open end of the dovetail recess.

The brake pad retaining plate is generally L-shaped and has a rectangular aperture formed in the section of the L-shape which extends through the slot in said metal plate; the other section of the L-shape extending generally parallel to the plane of the plate. A cylindrical member engages in said aperture and is a close fit with complimentary surfaces provided in the walls of the slot in said metal plate. Thus the cylindrical member serves to guide the brake pad retaining plate in said slot. A spring retaining member is bolted to a raised part of said one face of the metal plate, and comprises a pair of springs which are engaged in blind bores in the brake pad retaining plate. Thus, to release a friction pad, the brake pad retaining plate member is lifted against its spring loading, by use of a suitable tool or manually, to thus allow the friction pad to be slid out of the dovetail recess.

Whilst the above design was made to a user specification requiring manual operation, it has been found that in use, in untutored hands, it is possible to use the conveniently located manual releasing part of the brake pad retaining plate to apply lateral movement to the brake shoe to confirm, from the slackness felt, that the brake is in the released condition before commencing a journey. Under some circumstances this may, by retracting the brake pad retaining plate, allow the brake pad to fall slightly and prevent the retaining plate from returning to its proper position under the influence of the return springs. In this condition subsequent braking forces can move the brake pad out from the dovetail recess in the brake shoe. The eventual outcome of pad loss from such an occurrence is damage to the brake shoe by braking contact with the brake disc.

The above described pad retaining plate assembly is available in component parts which are assembled on the shoe plate. Thus if replacement of worn parts is required, this has to be done on site, and involves the handling of several individual component parts, and the need to ensure that all parts are properly refitted. This, it will be appreciated, can be a difficult and time consuming operation, and parts can be lost.

A further disadvantage with the above described pad retaining plate assembly, is that after a long period of service the springs can and do fill with dirt, and products of corrosion making operation difficult, if not impossible. Cleaning the springs is tedious and often requires disassembly of the pad retaining plate assembly.

The aim of the present invention is to provide a brake pad retaining plate assembly which is easy to install and maintain, and which cannot be operated to release brake pad(s) inadvertently, yet requires a minimum of tools for its proper use.

According to the present invention there is provided a pad retaining plate assembly for use in a shoe brake assembly, said pad retaining plate assembly comprising a retaining plate which has a pair of bolts screwed into parallel bores in one end face of said plate, the shafts of said bolts extending through aligned bores in first and second plate members, and a spring engaged over the shaft of each bolt, engaging against said retaining plate and biassing said plate members towards the heads of the bolts, the plate member nearest the retaining plate, being adapted to be secured to a shoe plate of the shoe brake assembly.

In a preferred embodiment of the present invention, the retaining plate is a rectangular block of metal with a pair of bolts screwed into parallel blind bores in one end face of said block. The springs are engaged over the shafts of the bolts and press planar first and second plate members against each other and against the heads of the respective bolts. The plate member which directly engages the heads of the bolts is a rectangular strip of metal having planar surfaces, and the other plate member which is nearest the retaining plate, is a larger metal plate having planar surfaces, this larger metal plate extending laterally with respect to said bolts, well clear of the retaining plate, and having two bores by means of which it can be bolted to a raised portion of said one face of a shoe plate, adjacent said slot. The facing planar surfaces of the plate members thus engage together, and a groove is provided in one or other, or both facing planar surfaces, to allow a screw-driver or similar tool to be inserted, to force the plate members apart against said springs, and thus move the retaining plate to a released position when mounted on a shoe plate. To prevent the screw-driver from slipping a recess or hole is preferably provided in said larger plate member, the tip of the screw-driver being located in the recess or hole after it has been passed along said groove or grooves.

The above pad retaining plate, springs, bolts and plate members, thus form a sub-assembly which can be manufactured in a factory and simply bolted to a shoe plate in situ, on for example, a railway vehicle. This sub-assembly thus simplifies replacement. Further, solely a screw-driver is required to force the said plate members apart to release the pad retaining plate and allow a friction pad to be replaced; manual operation, and its problems if effected accidentally, being prevented.

The present invention will now be further described, by way of example, with reference to the accompanying drawings, in which.

Figure 1:
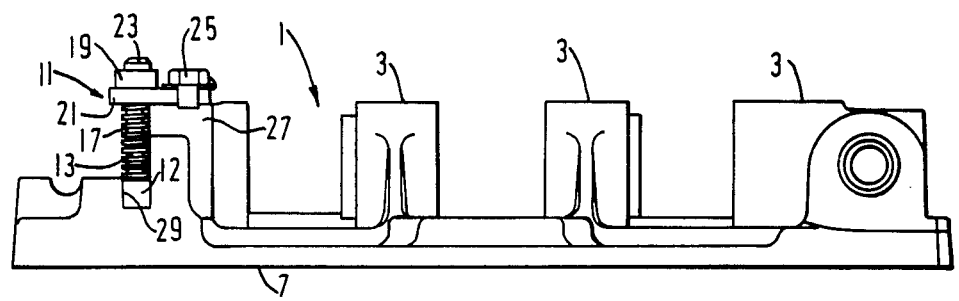
FIG. 1 is a front view of a shoe plate assembly incorporating a pad retaining plate assembly constructed according to the present invention.
Figure 2:
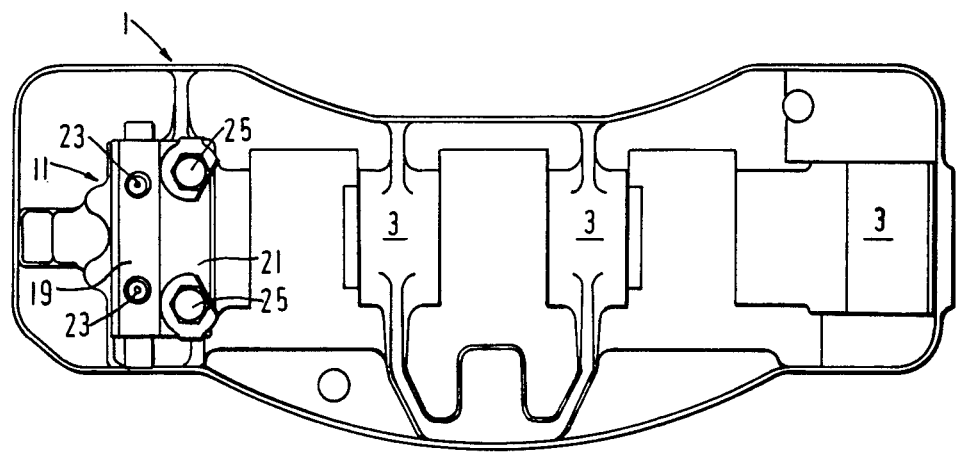
FIG. 2 is a plan view of the shoe plate assembly of FIG. 1.
Figure 3:
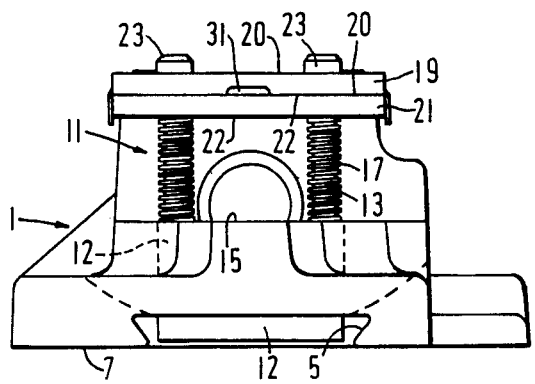
FIG. 3 is an end elevation of the shoe plate assembly shown in FIGS. 1 and 2.

The shoe plate assembly shown in the accompanying drawings comprises a generally rectangular shoe plate (1) which has a number of bearing housings (3) formed on one face thereof, for pivotally supporting the shoe plate assembly on a brake, and an elongate dovetail-shaped recess (5) formed in the other face (7)—see FIG. 3. In use, a dovetail-shaped portion of a friction pad (not shown), is engaged in the complimentary dovetail-shaped recess (5) of the shoe plate (1); a pad retaining plate 12 of pad retaining plate assembly (11) holding the friction pad in the recess (5).

The pad retaining plate assembly (11) comprises a retaining plate in the form of a rectangular block of metal (12), with a pair of bolts (13) screwed into parallel blind bores (not shown) in one end face (15) of the block (12). Mounted on the shaft of each bolt (13) is a spring (17) together with two plate members (19, 21). Each plate member has oppositely facing planar surfaces (20, 22) and a pair of bores extending therebetween, corresponding bores in each plate member being coaxial with each other, and the bores in each plate being so spaced apart from each other that the shafts of the bolts (13) can be passed therethrough. The springs (17) engage against said one end face (15) of the block (12) and press the two plate members (19, 21) against each other, and against the heads (23) of the bolts (13); the springs (17) being always compressed to a certain extent. The plate member (19) adjacent to the bolt heads (23) is a rectangular strip of metal whereas the plate member (21) nearest the springs (17) is larger and extends laterally beyond the block (12). This lateral extension of plate member (21) has two apertures by means of which the retaining plate assembly can be bolted by bolts (25), as a preconstructed sub-assembly, on a raised portion (27) of the shoe plate (1), with the retaining plate (12) extending through a slot (29) in the shoe plate (1), across the end of dovetail recess (5)—see FIG. 3.

The plate member (19) has a groove (31) cut in the planar surface (22) which engages with the other plate member (21), and the other plate member (21) has a bore or recess (not shown) located in line with the groove (31). During maintenance a screw-driver can be engaged in the groove (31) to enable the plate members to be forced apart against the springs (17), to thus lift the retaining plate (12) and allow a friction pad to be replaced in the dovetail recess (5). To prevent the screw-driver from slipping, the tip of the screw-driver can be engaged over the lip of the bore or recess (not shown) located in line with the groove (31).

As the plate member (19) nearer to the bolt heads (23) is the smaller plate member, a tool e.g. screw-driver, has to be used to lift the retaining plate (12) and thus accidental manual operation of the pad retaining plate assembly (11) is prevented.

Further, as the pad retaining plate assembly (11) is an integral sub-assembly which is previously manufactured, it can be simply replaced in situ as and when required, unlike the prior art arrangements where the pad retaining plate assembly has to be assembled on site from its component parts.

A further added advantage arises from the fact that the bolts (13) pass through, and therefore block, the centres of the springs (17). In the prior art, the centres of the springs can and do become blocked with dirt and the products of corrosion, making it difficult to operate the pad retaining plate assembly. Such open springs are also difficult to clean in situ. However with the present invention, the springs (17) are effectively filled with the shafts of the bolts (13) and it is a relatively simple matter to clean the spaces between adjacent coils, with, for example, the tip of a screw-driver.

The present invention thus provides a pad retaining plate assembly which is simple in construction and which overcomes a number of problems inherent in equivalent prior art assemblies.

We claim:

1. A pad retaining plate assembly for use in a shoe brake assembly, said pad retaining plate assembly comprising a retaining plate which has a pair of bolts screwed into parallel bores in one end face of said plate, each bolt having an elongate shaft and a head, the shafts of said bolts extending through aligned bores in first and second relatively movable plate members, and a spring engaged over the shaft of each bolt, engaging against said retaining plate and biassing said plate members towards the heads of the bolts to allow resilient movement of said retaining plate relative to said plate members, the plate member nearest the retaining plate being adapted to be secured to a shoe plate of the shoe brake assembly.

2. An assembly according to claim 1, wherein the retaining plate is a rectangular block of metal with the bolts screwed into parallel blind bores in one end face of the block.

3. An assembly according to claim 1, wherein said springs press said plate members against each other with one plate member being engaged against the heads of the bolts.

4. An assembly according to claim 3, wherein the other plate member nearest to the retaining plate is larger than said one plate member and extends laterally beyond said one plate member in a direction normal to the plane in which the axes of said bolts lie.

5. An assembly according to claim 1, wherein said plate members are planar with a groove provided in one of the facing surfaces of the plate members.

6. An assembly according to claim 5, wherein a recess is provided in one of said facing surfaces, aligned with said groove.

7. An assembly according to claim 1, when mounted on a shoe brake assembly.

8. An assembly according to claim 7, wherein the plate member nearest the retaining plate is larger than the other plate member and extends laterally beyond said other plate member in a direction normal to the plane in which the axes of the bolts lie, said plate member nearest the retaining plate being bolted to one face of a shoe plate adjacent to a slot in the shoe plate, so that said retaining plate extends through said slot.

* * * * *